United States Patent [19]
Yanagawa et al.

[11] Patent Number: 5,982,733
[45] Date of Patent: Nov. 9, 1999

[54] OPTICAL HEAD

[75] Inventors: Naoharu Yanagawa; Fumihiko Sano, both of Tokorozawa, Japan

[73] Assignee: Pioneer Electronic Corporation, Tokyo-to, Japan

[21] Appl. No.: 09/061,967

[22] Filed: Apr. 17, 1998

[30] Foreign Application Priority Data

Apr. 21, 1997 [JP] Japan .................................... 9-117540

[51] Int. Cl.$^6$ .................................................. G11B 7/14
[52] U.S. Cl. .................. 369/112; 369/44.37; 369/44.23; 369/94; 369/119
[58] Field of Search ............................ 369/44.37, 44.14, 369/44.23, 100, 112, 119, 94, 44.35; 359/637, 822

[56] References Cited

U.S. PATENT DOCUMENTS

| | | | |
|---|---|---|---|
| 4,965,785 | 10/1990 | Tadokoro et al. | 369/112 |
| 5,029,151 | 7/1991 | Shikichi | 369/44.35 |
| 5,226,029 | 7/1993 | Takanashi et al. | 369/100 |
| 5,295,125 | 3/1994 | Oonishi et al. | 369/44.29 |
| 5,381,394 | 1/1995 | Yanagawa | 369/100 |
| 5,499,143 | 3/1996 | Sakamoto et al. | 359/822 |
| 5,768,027 | 6/1998 | Takahashi | 359/637 |

*Primary Examiner*—John W. Cabeca
*Assistant Examiner*—Kim-Kwok Chu
*Attorney, Agent, or Firm*—Kane, Dalsimer, Sullivan and Levy, LLP

[57] ABSTRACT

An optical head emits a plurality of light beams onto an information record medium to perform a recording operation and/or a reproducing operation. The optical head is provided with: a plurality of light source, each outputting one of the light beams; an objective lens for collecting the light beams outputted from the light sources onto the information record medium; an optical element located on the optical path of only one of the light beams; a detector for receiving the light beam from the information record medium and outputting a detection signal; and a generating circuit for generating a drive signal based on the detection signal. The optical head is further provided with a dual-axis actuator for actuating the optical element in an optical axis direction of the light beam and in a substantially perpendicular direction to the optical axis direction in accordance with the drive signal. Because the objective lens is commonly used for all of the light beams while the optical element is actuated by the dual-axis actuator, the number of parts in the optical head is reduced while permitting the necessary collection of the light beams from the information record medium.

12 Claims, 6 Drawing Sheets

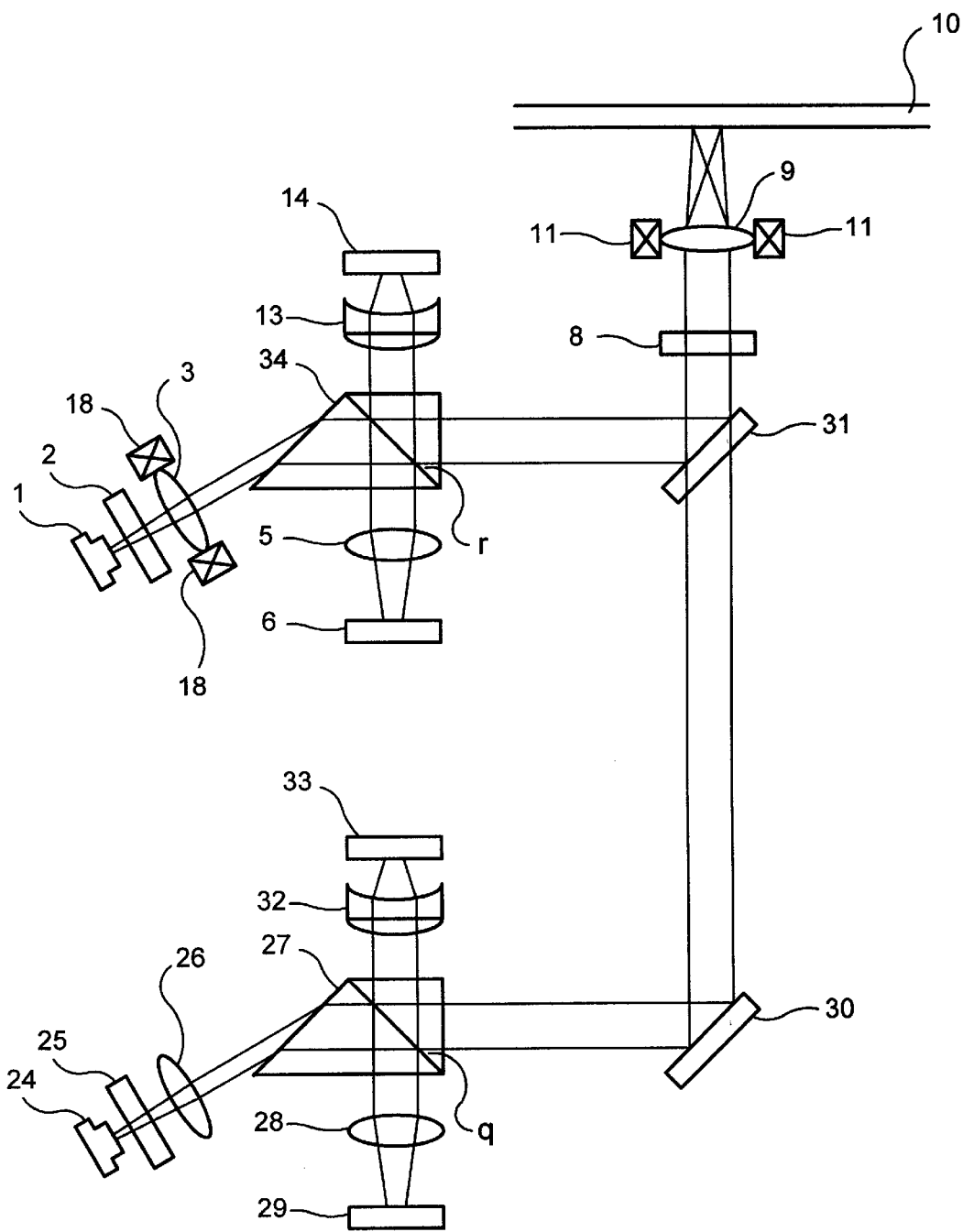
F I G. 6

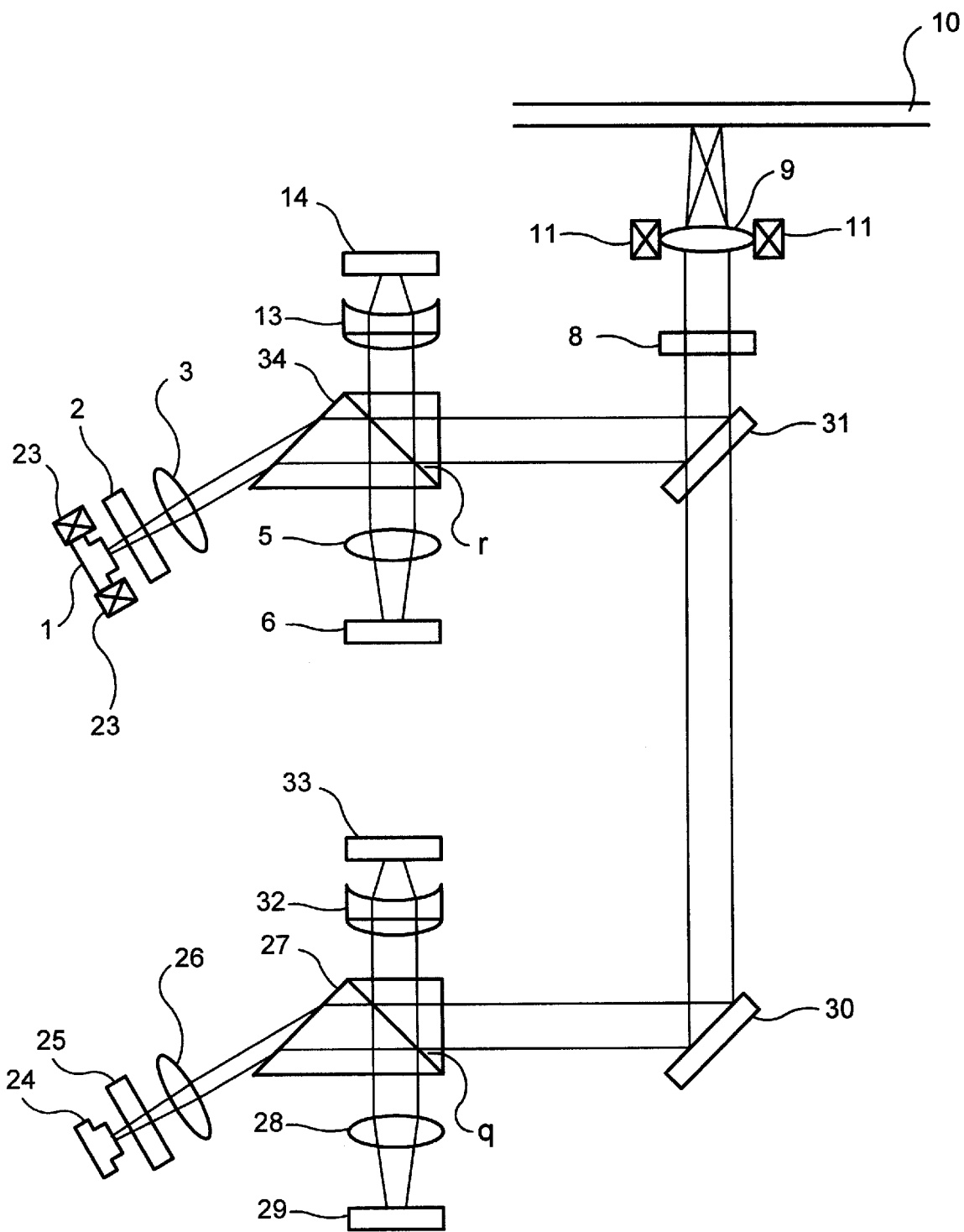
F I G. 7

OPTICAL HEAD

BACKGROUND OF THE INVENTION

1. Field of the Invention

The present invention relates to an optical head which is one component constituting an optical disc drive for collecting and emitting a light beam generated by a light source onto an optical disc to thereby record and reproduce information.

2. Description of the Related Art

Conventionally, an optical head of an optical disc drive uses one beam to thereby record and reproduce information.

Recently, an optical disc drive is used as an external memory device in a computer. In the computer, it is tried to improve a processing speed and increase an information amount in each program of driving the computer. Thus, an optical disc file composed of an optical disc for recording the information and an optical disc drive for driving the optical disc is required to improve a record density, a data transfer speed and the like.

A method of forming two beam spots and performing the simultaneous recording and reproducing operations by use of the two beam spots to thereby double the transfer speed is considered with regard to the data transfer technique in the above mentioned improvements.

As the technique of forming the two beam spots, there is a method of simply using two optical heads of an optical disc drive each using one beam, to thereby record or reproduce the information. However, the simple utilization of the two optical heads is not desirable from the viewpoint of the miniaturization of the optical disc drive and the reduction of the number of the parts.

SUMMARY OF THE INVENTION

It is therefore an object of the present invention to provide a two-beams optical head, which can improve a data transfer speed, in which the number of parts can be reduced and which size is small, as compared with the two optical heads which are simply independent of each other.

The above object of the present invention can be achieved by a first optical head for emitting a plurality of light beams onto an information record medium to perform at least one of recording and reproducing operations of the information on the information record medium. The first optical head is provided with: a plurality of light sources each outputting respective one of the light beams; an objective lens for collecting the light beams outputted from the light sources onto the information record medium; an optical element, which is located on an optical path of predetermined one of the light beams from predetermined one of the light sources, and which is not located on an optical path of the light beams other than the predetermined one light beam from the light sources other than the predetermined one light source; a detector for receiving only the predetermined one light beam returned from the information record medium and outputting a detection signal; a generating circuit for generating a drive signal based on the detection signal of the detector; and a dual axis actuator for actuating the optical element in an optical axis direction of the predetermined one light beam and in a substantially perpendicular direction to the optical axis direction in accordance with the drive signal.

According to the first optical head, when the light beams are outputted by the light sources, the light beams are collected by the objective lens onto the information record medium. Then, only the predetermined one light beam returned from the information record medium is received by the detector, and the detection signal such as a tracking error signal, a focusing error signal or the like, is outputted by the detector. Then, the drive signal based on the detection signal of the detector is generated by the generating circuit. Finally, the optical element such as a collimator lens or the like is actuated in the optical axis direction and in the substantially perpendicular direction in accordance with the drive signal, by the dual axis actuator. Especially, the optical element is located on the optical path of the predetermined one light beam, and is not located on the optical path of the light beams other than the predetermined one light beam.

Accordingly, the actuation for the predetermined one light beam can be performed independently from that for the other light beam, so that the appropriate light irradiation conditions on the information record medium can be obtained as for all of the light beams e.g., the focusing servo control, the tracking servo control and the like can be performed independently for each of the light beams. In other words, if the actuations for the light beams are dependent to each other, it is difficult or almost impossible to obtain the appropriate light irradiation conditions on the information record medium as for all of the light beams. Consequently, the two-beams optical head or a plural-beams optical head can be realized, which can double the data transferring speed or the like, and which enables the precise recording and reproducing operations, according to the first optical head of the present invention.

In one aspect of the first optical head, the light sources output the light beams having characteristics different from each other, and the optical head is further provided with a polarization beam splitter for combining and separating the light beams depending upon the characteristics.

According to this aspect, when the light beams are outputted by the light sources, the light beams are combined and separated depending upon the characteristics of the light beams, by the polarization beam splitter.

I another aspect of the first optical head, the dual axis actuator actuates the optical element by use of a piezo-effect.

According to this aspect, the optical element such as a collimator lens or the like is actuated by use of the piezo-effect by the dual axis actuator such as a piezo-element or the like, which enables the miniaturization of the optical head.

In another aspect of the first optical head, the optical element is not located on an optical path of a reflection light of the predetermined one light beam from the information record medium.

According to this aspect, while the relative position of the light beam incident to the detector with respect to the position of the detector is not influenced by the actuation for the predetermined one light beam, the actuations for the light beams can be independently performed, so that the tracking servo control, the focusing servo control and the like can be performed independently for each of the light beams.

In another aspect of the first optical head, the optical element prescribes a focus condition and a position of a beam spot on the information record medium, which is formed by the predetermined one light beam, in accordance with an actuated position thereof in the optical axis direction and in the substantially perpendicular direction respectively.

According to this aspect, the focus condition of the beam spot can be controlled in accordance with the actuated position of the optical element in the optical axis direction, and the position of the beam spot on the information record medium can be controlled in accordance with the actuated position of the optical element in the substantially perpendicular direction. Thus, the focusing servo control and the tracking servo control can be performed independently for each of the light beams.

In this aspect, the optical element may be a collimator lens for collimating the predetermined one light beam. Thus, the focusing servo control and the tracking servo control can be performed by actuating the collimator lens.

In another aspect of the first optical head, the optical head is further provided with another dual axis actuator for actuating the objective lens in the optical axis direction and in the substantially perpendicular direction.

According to this aspect, the objective lens can be actuated by another dual axis actuator in the optical axis direction and in the substantially perpendicular direction, while the collimator lens is actuated by the dual axis actuator.

The above object of the present invention can be also achieved by a second optical head for emitting a plurality of light beams onto an information record medium to perform at least one of recording and reproducing operations of the information on the information record medium. The second optical head is provided with: a plurality of light sources each outputting respective one of the light beams; an objective lens for collecting the light beams outputted from the light sources onto the information record medium; a detector for receiving only predetermined one of the light beams, which is outputted from predetermined one of the light sources, returned from the information record medium and outputting a detection signal; a generating circuit for generating a drive signal based on the detection signal of the detector; and a dual axis actuator for actuating the predetermined one light source in an optical axis direction of the predetermined one light beam and in a substantially perpendicular direction to the optical axis direction in accordance with the drive signal.

According to the second optical head of the present invention, when the light beams are outputted by the light sources, the light beams are collected by the objective lens onto the information record medium. Then, only the predetermined one light beam returned from the information record medium is received by the detector, and the detection signal such as a tracking error signal, a focusing error signal or the like, is outputted by the detector. Then, the drive signal based on the detection signal of the detector is generated by the generating circuit. Finally, the predetermined one light source such as a semiconductor laser or the like is actuated in the optical axis direction and in the substantially perpendicular direction in accordance with the drive signal, by the dual axis actuator.

Accordingly, the actuation for the predetermined one light beam can be performed independently from that for the other light beam, so that the appropriate light irradiation conditions on the information record medium can be obtained as for all of the light beams e.g., the focusing servo control, the tracking servo control and the like can be performed independently for each of the light beams. Consequently, the two-beams optical head or a plural-beams optical head can be realized, which can double the data transferring speed or the like, and which enables the precise recording and reproducing operations, according to the second optical head of the present invention.

In one aspect of the second optical head, the light sources output the light beams having characteristics different from each other, and the optical head is further provided with a polarization beam splitter for combining and separating the light beams depending upon the characteristics.

According to this aspect, when the light beams are outputted by the light sources, the light beams are combined and separated depending upon the characteristics of the light beams, by the polarization beam splitter.

In another aspect of the second optical head, the dual axis actuator actuates the predetermined one light source by use of a piezo-effect.

According to this aspect, when the light sources are actuated by use of the piezo-effect by the dual axis actuator such as a piezo-element or the like, which enables the miniaturization of the optical head.

In another aspect of the second optical head, each of the light sources is a semiconductor laser for emitting the light beams.

According to this aspect, the light beams can be reliably and reliably outputted by the semiconductor laser, while the semiconductor laser is actuated in the optical axis direction and in the substantially perpendicular direction.

In another aspect of the second optical head, the optical head is further provided with another dual axis actuator for actuating the objective lens in the optical axis direction and in the substantially perpendicular direction.

According to this aspect, the objective lens can be actuated by another dual axis actuator in the optical axis direction and in the substantially perpendicular direction, while the collimator lens is actuated by the dual axis actuator.

The nature, utility, and further features of this invention will bemoreclearlyapparent from the following detailed description with respect to preferred embodiments of the invention when read in conjunction with the accompanying drawings briefly described below.

BRIEF DESCRIPTION OF THE DRAWINGS

FIG. 6 is a block diagram of an optical head as a third embodiment of the present invention; and FIG. 7 is a block diagram of an optical head as a fourth embodiment of the present invention.

DETAILED DESCRIPTION OF THE PREFERRED EMBODIMENTS

Referring to the accompanying drawings, embodiments of the present invention will be now explained.

(1) First Embodiment

At first, a multiple-beam optical head as a first embodiment according to the present invention is explained in detail with reference to FIGS.1 to 4C.

The multiple-beam optical head in the present embodiment is provided with two semiconductor lasers, and uses two light beams, which are respectively emitted by the semiconductor lasers, which have wavelengths same to each other and polarization directions different from each other, to thereby read and write information and perform a tracking control and a focusing control. Especially, a collimator lens, which is driven in an optical axis direction with respect to an optical axis of one of the light beams and in a substantially perpendicular direction to the optical axis direction, is disposed only on the optical path of one of the light beams emitted by one of semiconductor lasers. Thus, the focusing and tracking controls can be performed independently from the other of the light beams emitted by the other of semiconductor lasers.

Figure 1:
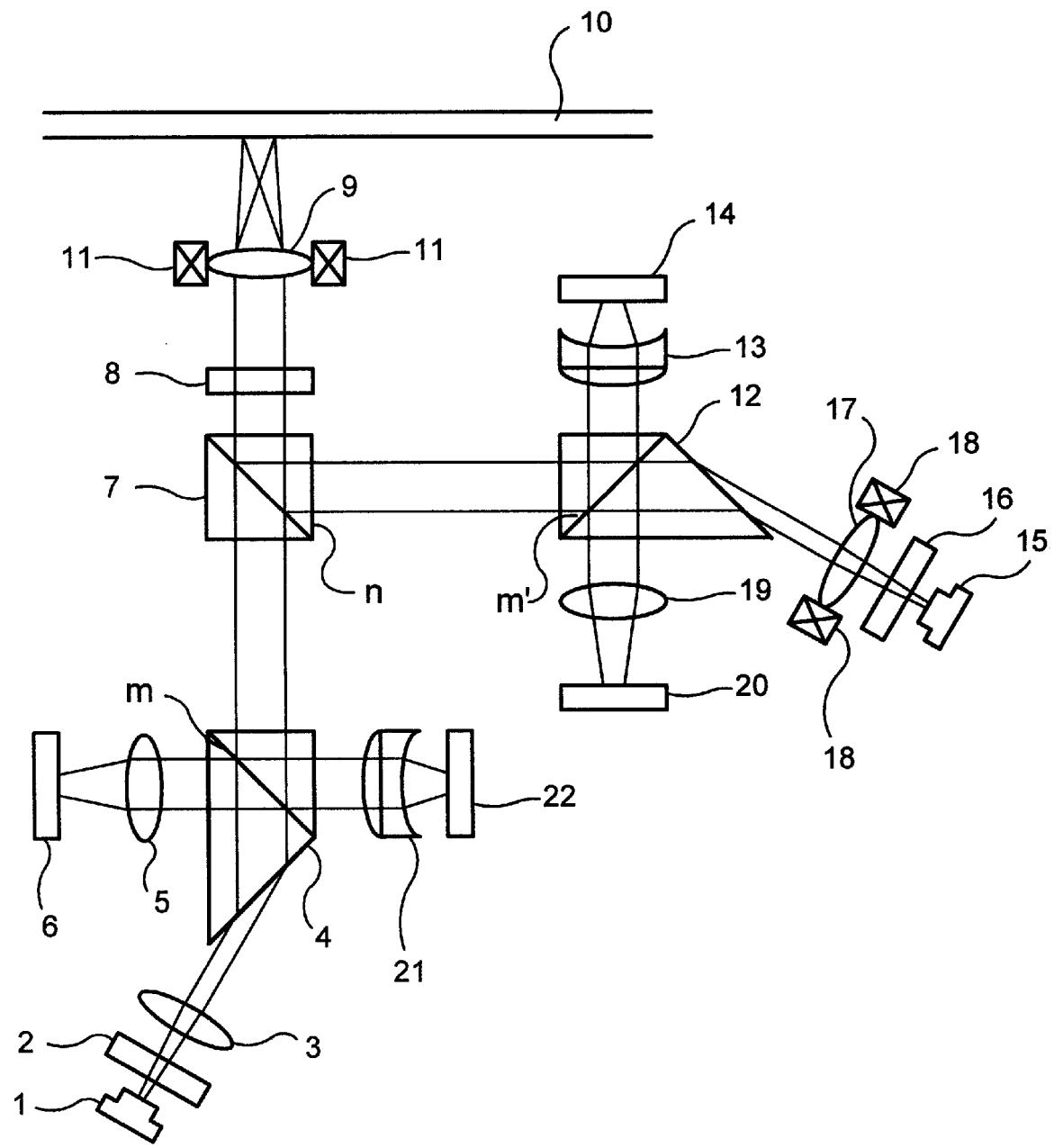
FIG. 1 is a block diagram of an optical head as a first embodiment of the present invention.

In FIG. 1, a light beam, which has a wavelength of 680 nm and a P polarization for example, is emitted by a semiconductor laser 1. The emitted light beam is firstly divided into a main beam and a sub beam by a diffraction grating 2. The main beam and the sub beam are respectively inputted through a collimator lens 3 to a beam splitter 4. The inputted main and sub beams are separated into reflection lights and transmission lights respectively by a semi-transparent film m of the beam splitter 4. Incidentally, the semi-transparent film m of the beam splitter 4 has such a characteristic that a transmittance for the incident light beam is about 70% and a reflectance for the incident light beam is about 30%. The light beam reflected by the semi-transparent film m is collected by a collective lens 5 and is guided to a front monitor 6. On the other hand, the transmitted light beam is guided through a PBS (Polarization Beam Splitter) 7 to a ¼ wavelength plate 8. A polarization surface of this light beam is rotated by the ¼ wavelength plate 8 and then becomes a circular polarization beam. This circular polarization beam is collected through an objective lens 9 onto a record surface of an optical disc 10, and then forms a first beam spot S1. Incidentally, the objective lens 9 is constructed so as to be driven in an optical axis direction with respect to an optical axis of this light beam and in a substantially perpendicular direction to the optical axis direction by a dual axis actuator 11. In other words, the objective lens 9 is driven by the dual axis actuator 11 so that a beam spot formed by the light beam is driven in a focusing direction and a tracking direction on the record surface of the optical disc 10. A reflection beam from the optical disc 10 is again guided through the objective lens 9 to the ¼ wavelength plate 8. The polarization surface of this light beam is further rotated by the ¼ wavelength plate 8. Then, this circular polarization beam becomes an S polarization beam and is inputted to the PBS 7, and then is reflected by a reflection film n of the PBS 7. Incidentally, the reflection film n of the PBS 7 has such a characteristic that a transmittance for the P polarization beam is about 100% and a reflectance for the S polarization beam is about 100%. The reflected S polarization beam is reflected, transmitted and separated by a semi-transparent film m' of a beam splitter 12. Incidentally, the beam splitter 12 has the configuration identical to that of the beam splitter 4. The semi-transparent film m' of the beam splitter 12 has such a characteristic that a transmittance for the incident light beam is about 70% and a reflectance for the incident light beam is about 30%. The light beam reflected by the semi-transparent film m' is collected by a multiple-lens 13 and is guided to a detector 14.

Next, a light beam emitted by a semiconductor laser 15, which is disposed apart from the semiconductor laser 1, is explained. Incidentally, it is assumed that the semiconductor laser 15 emits a light beam, which has a wavelength identical to that of the semiconductor laser 1 and a polarization direction different from that of the semiconductor laser 1. That is, the light beam, which has a wavelength of 680 nm and an S polarization for example, is emitted by the semiconductor laser 15. The emitted light beam is firstly divided into a main beam and a sub beam by a diffraction grating 16. The main beam and the sub beam are respectively inputted through a collimator lens 17 to a beam splitter 12. Incidentally, the collimator lens 17 is constructed so as to be driven in an optical axis direction with respect to an optical axis of the light beam and in a substantially perpendicular direction to the optical axis direction by a dual axis actuator 18. In other words, the collimator lens 17 is constructed to be driven by the dual axis actuator 18 so that the beam spot formed by the light beam Us driven in the focusing direction and the tracking direction on the record surface of the optical disc 10. The main beam and the sub beam inputted to the beam splitter 12 are reflected, transmitted and separated by the semi-transparent film m' respectively. The light beam reflected by the semi-transparent film m' is collected by a collective lens 19 and is guided to a front monitor 20. On the other hand, the transmitted light beam having the S polarization is reflected by the reflection film n of the PBS 7. A polarization surface of this light beam is rotated by the ¼ wavelength plate 8, and then becomes a circular polarization beam. This circular polarization beam is collected through the objective lens 9 onto the record surface of the optical disc 10, and then forms a second beam spot S2. A reflection beam from the optical disc 10 is again guided through the objective lens 9 to the ¼ wavelength plate 8. The polarization surface of this light beam is again rotated by the ¼ wavelength plate 8 and becomes a P polarization beam, which is transmitted by the PBS 7. The transmitted P polarization beam is reflected, transmitted and separated by the semi-transparent film m of the beam splitter 4. The light beam reflected by the semi-transparent film m is collected by a multiple-lens 21 and is guided to a detector 22.

An output power of the light beam emitted by the semiconductor laser 1 is controlled through a driver circuit (not shown) on the basis of an output signal from the front monitor 6. Similarly, an output power of the light beam emitted by the semiconductor laser 15 is controlled through a driver circuit (not shown) on the basis of an output signal from the front monitor 20.

Figure 2:
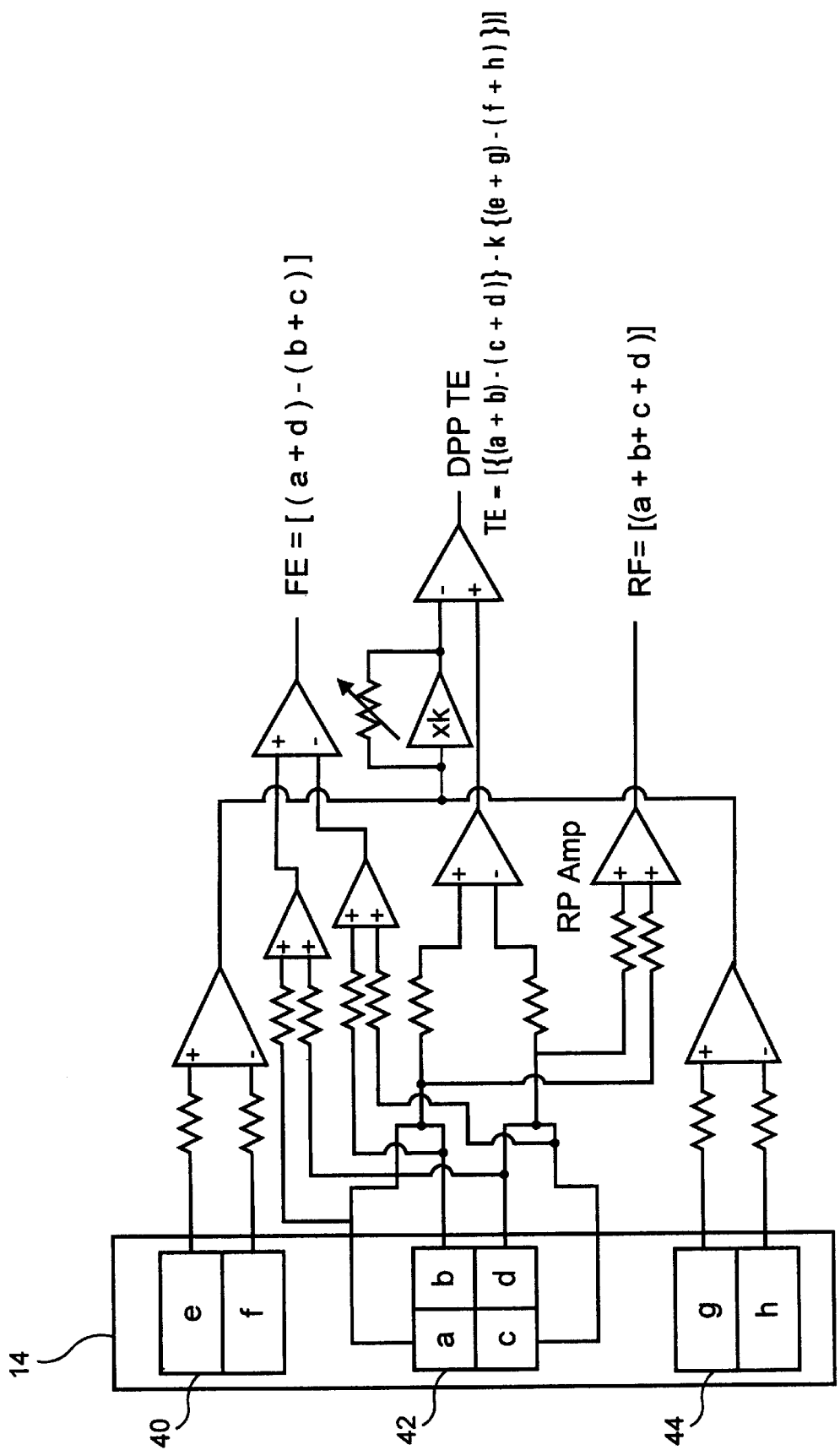
FIG. 2 is a circuit diagram of a processing circuit for various servo signals in the first embodiment.

FIG. 2 shows one example of the detector 14 for receiving the light beam from the semiconductor laser 1, and a generating circuit for generating various servo signals based on output signals from the detector 14. The detector 14 is provided with a four-division light receiving element 42 composed of areas a, b, c and d, a two-division light receiving element 40 composed of areas e and f, and a two-division light receiving element 44 composed of areas g and h. The four-division light receiving element 42 receives the main beam, and the two two-division light receiving elements 40, 44 receives the two sub beams, respectively. An RF (Radio Frequency) signal, a tracking error (TE) signal and a focusing error (FE) signal are determined on the basis of detection signals in the respective areas a to h.

That is, in the illustrated example, the RF signal is calculated as following.

$$RF = (a+b+c+d)$$

The TE signal is calculated as following.

$$TE = [\{(a+b)-(c+d)\} - k\{(e+g)-(f+h)\}]$$

The k is a coefficient representing an amplification factor. For example, it is 10. Moreover, the FE signal is calculated as following.

$$FE = \{(a+d)-(b+c)\}$$

In the above expressions, the reference signs a to h represent the respective areas in the respective light receiving elements, and further represents the detection signals (i.e., the light amounts) detected in the respective areas.

The thus-calculated TE and FE signals are sent to the drive circuit (not shown) of the dual axis actuator 11. The drive circuit drives the dual axis actuator 11 based on the sent TE and FE signals. The drive of the dual axis actuator 11 causes the objective lens 9 to be driven. Accordingly, the tracking control and the focusing control for the first beam spot S1 are performed.

The detector 22 has the configuration similar to that of the detector 14, and has the generating circuit similar thereto, and similarly generates the RF signal, the TE signal and the FE signal. Incidentally, the TE signal and the FE signal generated by the output signal from the detector 22 are sent to the drive circuit (not shown) of the dual axis actuator 18. The drive circuit drives the dual axis actuator 18 based on the sent TE and FE signals. The drive of the dual axis actuator 18 causes the collimator lens 17 to be driven. Accordingly, the tracking control and the focusing control of the second beam spot S2 are performed The tracking control and the focusing control, in which the thus-calculated TE signal and FE signal are used, are explained. That is, a method of freely controlling a size and a relative positional relation of the two beam spots with respect to the record tracks on the record surface of the optical disc 10 is explained with reference to FIGS. 3A to 3C and FIGS. 4A to 4C.

In each of FIGS. 3A to 3C and FIGS. 4A to 4C, there are shown tracks A and B formed on the record surface of the optical disc 10, and the first beam spot Si and the second beam spot S2, which are respectively formed by the light beams from the semiconductor lasers 1 and 15 on the record surface of the optical disc 10 through the objective lens 9.

Figure 3A:
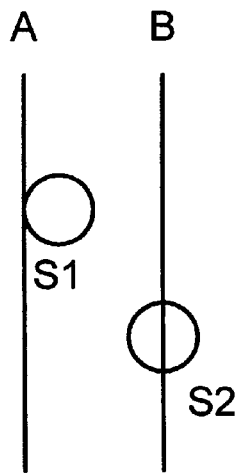
FIGS. 3A to 3C are diagrams explaining a tracking control in the optical head of the present invention.
Figure 3B:
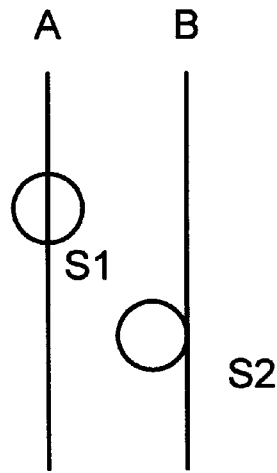
Figure 3C:
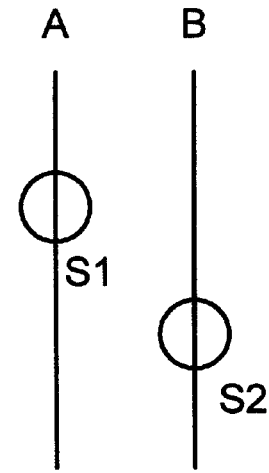

As shown in FIG. 3A, when the first beam spot S1 is in an off-track condition to the track A, the tracking control is performed for the first beam spot S1. That is, the tracking control is performed such that the objective lens 9 is driven by the dual axis actuator 11 on the basis of the TE signal from the detector 14 for receiving the light beam, which is emitted by the semiconductor laser 1 and is reflected by the optical disc 10, and then the first beam spot S1 is shifted in left and right directions (the left direction in the example of FIG. 3A) with respect to the tracks A and B. When the tracking control is performed for the first beam spot S1 as mentioned above, the first beam spot S1 becomes in an on-track condition to the track A (i.e., located on the track A) as shown in FIG. 3B. However, the second beam spot S2 is shifted in the left direction similarly to the first beam spot S1 associated with the shift of the objective lens 9. At this time, the TE signal based on the second beam spot S2 is not considered at all. Thus, the second beam spot S2 is not always located on the track B. For this reason, the tracking control is performed such that the collimator lens 17 is driven by the dual axis actuator 18 and thereby only the second beam spot S2 is shifted in the right direction, on the basis of the TE signal from the detector 22 for receiving the light beam from the semiconductor laser 15, so that, while maintaining the on-track condition to the track A of the first beam spot S1, the second beam spot S2 may be also in the on-track condition to the track B. The above mentioned configuration enables the first beam spot S1 to be located on the track A, and the second beam spot S2 to be located on the track B, respectively, as shown in FIG. 3C.

The focusing control is explained with reference to FIGS. 4A to 4C. Each of the first beam spot S1 shown in FIG. 4A and the second beam spot S2 shown in FIG. 4B is in a non-focused state on the record surface, and each of the other beam spots S1 and S2 is in a focused state on the record surface.

Figure 4A:
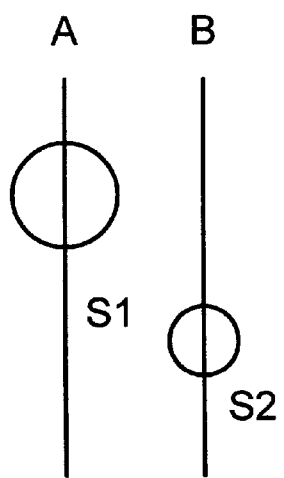
FIGS. 4A to 4C are diagram explaining a focusing control in the optical head of the present invention.
Figure 4B:
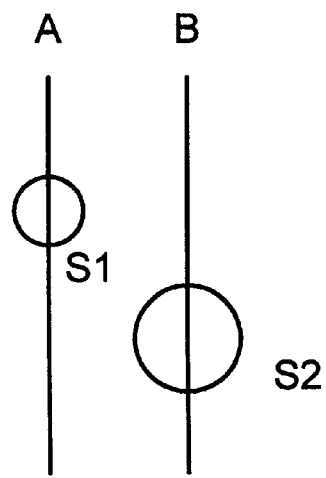
Figure 4C:
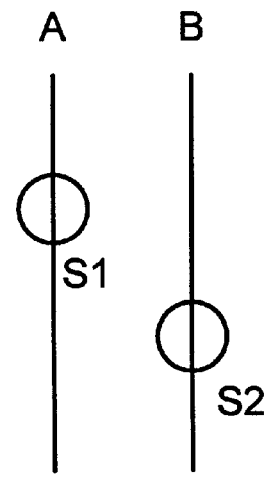

In FIG. 4A, when the first beam spot S1 is in the non-focused state on the record surface, the FE signal corresponding to such a non-focused state is outputted by the detector 14 for receiving the light beam from the semiconductor laser 1. The dual axis actuator 11 drives the objective lens 9 in a direction perpendicular to the record surface, namely, in a focusing direction, on the basis of the FE signal, so that the first beam spot S1 becomes in a focused state. If the focusing control is performed for the first beam spot S1 as mentioned above, the first beam spot S1 becomes in the focused state as shown in FIG. 4B. However, the focus of the second beam spot S2 is shifted in the direction perpendicular to the record surface, similarly to the first beam spot S1, associated with the shift of the objective lens 9. At this time, the FE signal based on the second beam spot S2 is not considered at all. Thus, the second beam spot S2 is not always in the focused state on the record surface. For this reason, the focusing control is performed such that the collimator lens 17 is driven by the dual axis actuator 18 and thereby only the second beam spot S2 is focused, on the basis of the FE signal from the detector 22 for receiving the light beam from the semiconductor laser 15, so that, while maintaining the focused state of the first beam spot S1, the second beam spot S2 is also focused. The above mentioned configuration enables both the first beam spot S1 and the second beam spot S2 to be in the focused state on the record surface.

In short, on one hand, the tracking control and the focusing control applied to the light beam from the semiconductor laser 1 are performed by the driving operation of the dual axis actuator 1, which supports the objective lens 9, on the basis of the TE signal and the FE signal generated on the basis of the detection signal from the detector 14. On the other hand, the tracking control and the focusing control applied to the light beam from the semiconductor laser 15 are performed by the driving operation of the dual axis actuator 18, which supports the collimator lens 17, on the basis of the TE signal and the FE signal generated on the basis of the detection signal from the detector 22, in addition to the driving operation of the dual axis actuator 11, which supports the objective lens 9.

The above mentioned configuration enables the tracking control and the focusing control at both of the two beam spots to be performed independently from each other.

The dual axis actuator 18 may be constituted by a coil in which the electromagnetic force is used. Alternatively, since especially the dual axis actuator 18 performs only the fine adjustment, it is allowable to use a piezo-device, in which a piezo-effect is used, for the dual axis actuator 18.

In FIGS. 3A to 3C, an example of using a DPP (Differential Push-Pull) method as the method of the tracking control is indicated. However, it is not limited thereto. For example, a three-beam method, a push-pull method or the like may be used for the tracking control method. Moreover, this embodiment uses the two light beams having the same wavelength. Hence, if equalizing the distances of both the light beams from the semiconductor lasers and to the PBS 7, to each other, the actuator for driving the optical device disposed on the optical path of the light beam emitted by one of the semiconductor lasers may be driven only in the tracking direction. Moreover, it is allowable to use (i) a PBS including a reflection film, which has such a characteristic that a transmittance for the P polarization beam is about 70% and a reflectance for the P polarization beam is about 30%, instead of the beam splitter 4, and (ii) a PBS including a reflection film, which has such a characteristic that a transmittance for the S polarization beam is about 70% and a reflectance for the S polarization beam is about 30%, instead of the beam splitter 12.

Furthermore, since the optical head shown in FIG. 1 is the optical head for the recording and reproducing operations, it is constructed to use the front monitors 6 and 20 to thereby adjust the laser powers of the semiconductor lasers 1 and 15 respectively. However, it is not limited thereto. It may be an optical head dedicated to the reproducing operation. In this case, the collective lens 5 and the objective lens 9, and the front monitors 6 and 20 are unnecessary. Accordingly, the respective characteristics of the semi-transparent films m and m' of the beam splitters 4 and 12 may be respectively changed such that a transmittance for the P polarization beam is about 100% and a reflectance for the S polarization beam is about 100%.

(2) Second Embodiment

Figure 5:
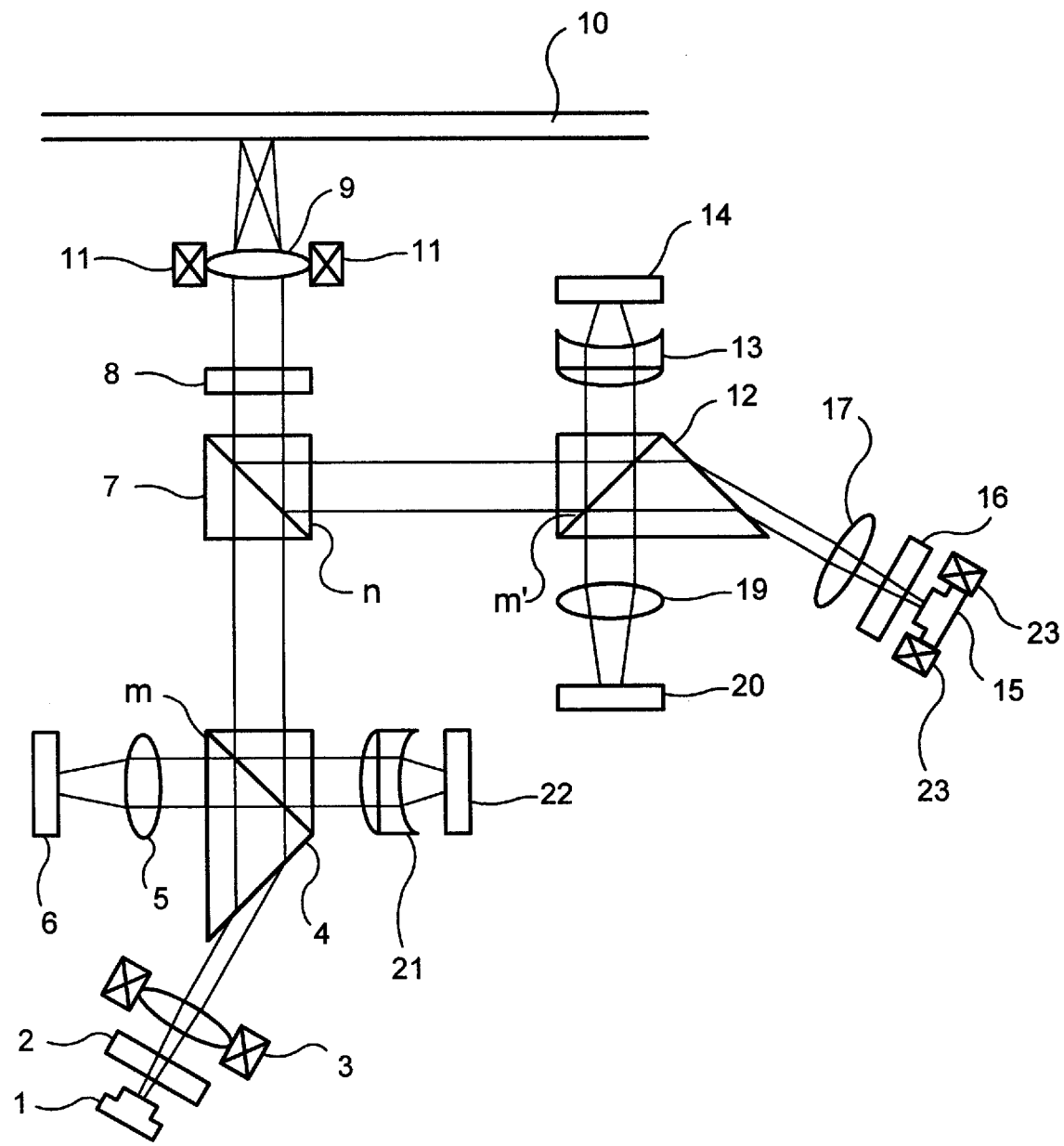
FIG. 5 is a block diagram of an optical head as a second embodiment of the present invention.

Next, a multiple-beam optical head as a second embodiment according to the present invention is explained with reference to FIG. 5. In FIG. 5, the same constitutional elements as those in the first embodiment of FIG. 1 carry the same reference numerals, and the explanations thereof are omitted.

A multiple-beam optical head in the present embodiment is provided with two semiconductor lasers, and then uses two light beams, which are respectively emitted by the semiconductor lasers, which have wavelengths same to each other and polarization directions different from each other, to thereby read and write information and perform the tracking control and the focusing control. Especially, one of the semiconductor lasers is driven in an optical axis direction with respect to an optical axis of the emitted light beam and in a substantially perpendicular direction to the optical axis direction by a dual axis actuator. Thus, the focusing and tracking controls for one of the light beams can be performed respectively independently from the other of the light beams emitted by the other of the semiconductor lasers.

In FIG. 5, a semiconductor laser 15 is constructed so as to be driven in an optical axis direction with respect to an optical axis of the light beam and in a substantially perpendicular direction to the optical axis direction. Incidentally, a dual axis actuator 23 drives the semiconductor laser 15, on the basis of the TE signal generated by the detector 22. That is, the point different from the above mentioned first embodiment is that the dual axis actuator 18 disposed at the collimator lens 17 is removed, the dual axis actuator 23 is disposed at the semiconductor laser 15 and then the driving operation of the semiconductor laser 15 itself performs the tracking and focusing servo controls. Since the other configuration is the same as the above mentioned first embodiment, the explanations thereof are omitted.

(3) Third Embodiment

Next, a multiple-beam optical head as a third embodiment according to the present invention is explained with reference to FIG. 6. In FIG. 6, the same constitutional elements as those in the first embodiment of FIG. 1 carry the same reference numerals and the explanations thereof are omitted.

The multiple-beam optical head in the present embodiment is provided with two semiconductor lasers, and then uses two light beams, which are emitted by the semiconductor lasers and have wavelengths different from each other, to thereby read and write information and perform the tracking and focusing servo controls. Especially, it is provided with a collimator lens, which is disposed on an optical path of the light beam emitted by one of the semiconductor lasers and is driven in an optical axis direction with respect to an optical axis of the light beam and in a substantially perpendicular direction to the optical axis direction. Hence, it can perform the focusing and tracking controls respectively for one of the light beams independently from the other of the light beams emitted by the other of the semiconductor lasers.

In FIG. 6, a light beam, which has a wavelength of 635 nm and a P polarization for example, is emitted by a semiconductor laser 24. The emitted light beam is firstly divided into a main beam and a sub beam by a diffraction grating 25. The main beam and the sub beam are respectively inputted through a collimator lens 26 to a PBS 27. The inputted main and sub beams are separated into reflection lights and transmission lights respectively by a reflection film q of the PBS 27. Incidentally, the reflection film q of the PBS 27 has such a characteristic that a transmittance for the P polarization beam is about 90% and a reflectance for the P polarization beam is about 10%, and that a reflectance for the S polarization beam is about 100%. The light beam reflected by the reflection film q is collected by a collective lens 28 and is guided to a front monitor 29. On the other hand, the transmitted light beam is reflected by a reflection plate 30, and is guided through a dichroic mirror 31 to the ¼ wavelength plate 8. A polarization surface of this light beam is rotated by the ¼ wavelength plate 8 and then becomes a circular polarization beam. The dichroic mirror 31 is a mirror for transmitting the light beam, which has the wavelength not longer than a predetermined value e.g., 650 nm, and reflecting the light beam, which has the wavelength longer than the predetermined value. This circular polarization beam is collected through the objective lens 9 onto the record surface of the optical disc 10, and then forms the first beam spot S1. Incidentally, the objective lens 9 is constructed so as to be driven in the optical axis direction with respect to the optical axis of this light beam and in the substantially perpendicular direction to the optical axis direction by the dual axis actuator 11. In other words, the objective lens 9 is driven by the dual axis actuator 11 so that a beam spot formed by the light beam is driven in the focusing direction and the tracking direction on the record surface of the optical disc 10. The reflection beam from the optical disc 10 is again guided through the objective lens 9 to the ¼ wavelength plate 8. The polarization surface of this light beam is further rotated by the ¼ wavelength plate 8. Then, this circular polarization beam becomes the S polarization beam and is inputted to the dichroic mirror 31, is reflected by the reflection plate 30 and is then reflected by the reflection film q of the PBS 27. The reflected S polarization beam is collected by a multiple lens 32 and is guided to a detector 33.

Next, a light beam emitted by the semiconductor laser 1, which is disposed apart from the semiconductor laser 24, is explained. Incidentally, it is assumed that the semiconductor laser 1 emits a light beam, which has a wavelength different from that of the semiconductor laser 1. That is, the light beam, which has a wavelength of 680 nm and a P polarization for example, is emitted by the semiconductor laser 1. The emitted light beam is firstly divided into a main beam and a sub beam by the diffraction grating 2. The main beam and the sub beam are respectively inputted through a collimator lens 3 to a PBS 34. Incidentally, the collimator lens 3 is constructed so as to be driven in the optical axis direction with respect to the optical axis of the light beam and in the substantially perpendicular direction to the optical axis direction by a dual axis actuator 18. In other words, the collimator lens 3 is constructed to be driven by the dual axis actuator 18 so that the beam spot formed by the light beam is driven in the focusing direction and the tracking direction on the record surface of the optical disc 10. The main beam and the sub beam inputted to the PBS 34 are respectively reflected, transmitted and separated by a reflection film r of the PBS 34 respectively. Incidentally, the reflection film r of the PBS 34 has such a characteristic that a transmittance for the P polarization beam is about 90% and a reflectance for the P polarization beam is about 10%, and that a reflectance for the S polarization beam is about 100%, in the same manner as the reflection film q of the PBS 27. The light beam reflected by the reflection film r is collected by the collective lens 5 and is guided to the front monitor 6. On the other hand, the transmitted light beam having the P polarization is reflected by the dichroic mirror 31, and is guided to the ¼ wavelength plate 8. A polarization surface of this light beam is rotated by the ¼ wavelength plate 8, and then becomes a circular polarization beam. This circular polarization beam is collected through the objective lens 9 onto the record surface of the optical disc 10, and then forms the second beam spot S2. The reflection beam from the optical disc 10 is again guided through the objective lens 9 to the ¼ wavelength plate 8. The polarization surface of this light beam is again rotated by the ¼ wavelength plate 8 and becomes an S polarization beam. This S polarization beam is reflected by the dichroic mirror 31, is further reflected by the reflection film r of the PBS 34, is collected by the multiple-lens 13 and is guided to the detector 14.

(4) Fourth Embodiment

Next, a multiple-beam optical head as a fourth embodiment according to the present invention is explained with reference to FIG. 7. In FIG. 7, the same constitutional elements as those in the second or third embodiment of FIG. 4 or 6 carry the same reference numerals and the explanations thereof are omitted.

The multiple-beam optical head in the present embodiment is provided with two different semiconductor lasers, and then uses two light beams, which are emitted by the semiconductor lasers and have wavelengths different from each other, to thereby read and write information and perform the tracking and focus servo controls. Especially, it is constructed such that one of the semiconductor lasers is driven in the optical axis direction with respect to the optical axis of the emitted light beam and in the substantially perpendicular direction thereto, by a dual axis actuator. Hence, the focus and tracking controls can be performed respectively independently of the light beam emitted by the other semiconductor laser.

In FIG. 7, the semiconductor laser 1 is constructed so as to be driven in the optical axis direction with respect to the optical axis of the light beam and in the substantially perpendicular direction to the optical axis direction, by the dual axis actuator 23. Incidentally, the dual axis actuator 23 drives the semiconductor laser 1, on the basis of the TE signal generated from the detector 14. That is, the point different from the third embodiment is that the dual axis actuator 18 disposed at the collimator lens 3 is removed, and that the dual axis actuator 23 is disposed at the semiconductor laser 1 so as to perform the tracking and focusing servo controls by driving the semiconductor laser 1 itself. Since the other configuration is the same as that of the above mentioned third embodiment, the explanations thereof are omitted.

In each of the above described embodiments, not only the two light beams from the two semiconductor lasers may enable a simultaneous recording operation or a simultaneous reproducing operation, but also one of the two light beams may enable the recording operation while the other of the light beams may enable the reproducing operation. Moreover, not only the two light beams from the two semiconductor lasers may form two beam spots respectively on the tracks adjacent to each other, but also the two beams may form two beam spots on the same track. Furthermore, the first and second embodiments are constructed such that the dual axis actuators 18 and 23 are disposed at the collimator lens 17 and the semiconductor laser 15, respectively. However, they are not limited thereto. Fore example, the actuators may be disposed at the collimator lens 3 and the semiconductor laser 1, respectively. Moreover, the third and fourth embodiments are constructed such that the dual axis actuators 18 and 23 are disposed at the collimator lens 3 and the semiconductor laser 1, respectively. However, they are not limited thereto. The actuators may be disposed at the collimator lens 26 and the semiconductor laser 24, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical head for emitting a plurality of light beams onto an information record medium to perform at least one of recording and reproducing operations of the information on said information record medium, said optical head comprising:

a plurality of light sources each outputting respective one of the light beams;

an objective lens for collecting the light beams outputted from said light sources onto said information record medium;

an optical element, which is located on an optical path of predetermined one of the light beams from predetermined one of said light sources, and which is not located on an optical path of the light beams other than said predetermined one light beam from said light sources other than said predetermined one light source;

a detector for receiving only said predetermined one light beam returned from said information record medium and outputting a detection signal;

a generating circuit for generating a drive signal based on the detection signal of said detector; and a dual axis actuator for actuating said optical element in an optical axis direction of said predetermined one light beam and in a substantially perpendicular direction to the optical axis direction in accordance with the drive signal.

2. An optical head according to claim 1, wherein said light sources output the light beams having characteristics different from each other, and said optical head further comprises a polarization beam splitter for combining and separating the light beams depending upon the characteristics.

3. An optical head according to claim 1, wherein said dual axis actuator actuates said optical element by use of a piezo-effect.

4. An optical head according to claim 1, wherein said optical element is not located on an optical path of a reflection light of said predetermined one light beam from said information record medium.

5. An optical head according to claim 1, wherein said optical element prescribes a focus condition and a position of a beam spot on said information record medium, which is formed by said predetermined one light beam, in accordance with an actuated position thereof in the optical axis direction and in the substantially perpendicular direction respectively.

6. An optical head according to claim 5, wherein said optical element comprises a collimator lens for collimating said predetermined one light beam.

7. An optical head according to claim 1, further comprising another dual axis actuator for actuating said objective lens in the optical axis direction and substantially perpendicular to the optical axis direction.

8. An optical head for emitting a plurality of light beams onto an information record medium to perform at least one of recording and reproducing operations of the information on said information record medium, said optical head comprising:

a plurality of light sources each outputting respective one of the light beams;

an objective lens for collecting the light beams outputted from said light sources onto said information record medium;

a detector for receiving only predetermined one of the light beams, which is outputted from predetermined one of said light sources, returned from said information record medium and outputting a detection signal;

a generating circuit for generating a drive signal based on the detection signal of said detector; and a dual axis actuator for actuating said predetermined one light source in an optical axis direction of said predetermined one light beam and in a substantially perpendicular direction to the optical axis direction in accordance with the drive signal.

9. An optical head according to claim 8, wherein said light sources output the light beams having characteristics different from each other, and said optical head further comprises a polarization beam splitter for combining and separating the light beams depending upon the characteristics.

10. An optical head according to claim 8, wherein said dual axis actuator actuates said predetermined one light source by use of a piezo-effect.

11. An optical head according to claim 8, wherein each of said light sources comprises a semiconductor laser for emitting the light beams.

12. An optical head according to claim 8, further comprising another dual axis actuator for actuating said objective lens in the optical axis direction and substantially perpendicular to the optical axis direction.

* * * * *